(12) United States Patent
Webb et al.

(10) Patent No.: US 9,707,566 B2
(45) Date of Patent: Jul. 18, 2017

(54) DEVICE FOR BREAKING GLASS

(71) Applicant: GLASSBUSTERS LIMITED, London (GB)

(72) Inventors: Ian Webb, London (GB); Peter Ancketill, London (GB)

(73) Assignee: GLASSBUSTERS LIMITED, London (GB)

( * ) Notice: Subject to any disclaimer, the term of this patent is extended or adjusted under 35 U.S.C. 154(b) by 63 days.

(21) Appl. No.: 14/431,506

(22) PCT Filed: Sep. 26, 2013

(86) PCT No.: PCT/GB2013/052507
§ 371 (c)(1),
(2) Date: Mar. 26, 2015

(87) PCT Pub. No.: WO2014/049353
PCT Pub. Date: Apr. 3, 2014

(65) Prior Publication Data
US 2015/0251190 A1    Sep. 10, 2015

(30) Foreign Application Priority Data
Sep. 26, 2012    (GB) .................................. 1217205.2

(51) Int. Cl.
*B02C 23/28*    (2006.01)
*B02C 19/00*    (2006.01)
*B02C 23/34*    (2006.01)

(52) U.S. Cl.
CPC .......... *B02C 19/0087* (2013.01); *B02C 23/28* (2013.01); *B02C 23/34* (2013.01); *Y02W 30/60* (2015.05)

(58) Field of Classification Search
CPC ..... B02C 19/0087; B02C 23/34; B02C 23/28; Y02W 30/60
USPC ....................................................... 241/99, 48
See application file for complete search history.

(56) References Cited

U.S. PATENT DOCUMENTS

| | | | | |
|---|---|---|---|---|
| 5,242,126 A | * | 9/1993 | Bomze | B02C 19/0087 241/278.1 |
| 2001/0025895 A1 | * | 10/2001 | Kamiya | B02C 13/18 241/99 |
| 2005/0193770 A1 | * | 9/2005 | Schoonhoven | B02C 18/18 65/29.12 |
| 2009/0029841 A1 | * | 1/2009 | Monaghan | B02C 19/0087 501/11 |

* cited by examiner

*Primary Examiner* — Mark Rosenbaum
(74) *Attorney, Agent, or Firm* — Thorpe North & Western (57) ABSTRACT

The invention is directed to a glass disposal system. A device (10) for breaking glass articles is provided, which comprises an inlet (12) and an outlet (26) in fhrkl communication with one another and having a rotating member (16) interposed therebetween. The rotating member (16) is attached to, and capable of being rotated by, a motor (24). The inlet (12) to the device (10) opens onto the rotatable member (16) and the outlet (26) is substantially tangential to the rotatable member (16). The rotatable member (16) comprises portions to create an overall flow of air from the inlet (12) towards the outlet (26), and subsequently expels the particles of the broken object away from the rotatable member (16) through the outlet (26). The invention extends to a conduit (60) for the system.

17 Claims, 5 Drawing Sheets

DEVICE FOR BREAKING GLASS

FIELD OF THE INVENTION

This invention relates to an improved device for breaking glass and glass-like materials, including ceramic materials, into smaller particles, which can be more readily stored.

BACKGROUND TO THE INVENTION

Bars and restaurants create a large amount of waste in the form of bottles and other glass articles. Generally, these are stored in large bins and then disposed of by collection in trucks. The mass of glass which a truck is able to take away is dictated by the space available rather than the weight because the majority of the load is air contained within the glass: for example in the internal volume of an intact bottle. Trucks can transport up to eight times as much crushed glass as complete bottles. Therefore, it is advantageous to transport crushed glass rather than whole bottles.

Where glass crushing devices are used, they usually have to be operated either away from customers and/or after closing time of the premises due to the noise produced during use. Additionally, the trucks collecting the bottles also create a large amount of noise, especially when tipping a large number of whole bottles into a container. This can be particularly irritating early in the morning or late at night.

One problem with crushed glass is that it can contain sharp projections that can cut skin. Additionally, during the crushing process, there may be shards of glass that are projected out of the crushing device back towards a user, thereby putting the user at risk of being hit by high-speed glass. Even where the risk of glass being projected back towards the user is low, glass dust may be expelled by the device and breathed in by a user.

A further disadvantage of traditional methods of dealing with commercial glass waste is that the bottles are often stored behind the bar and then moved to another location at the end of the night when the customers have left. This creates 'double-handling' whereby the glass has to be moved twice, once to the bin behind the bar and then again to the bin for collection. This increases the amount of time that the staff are required for a shift and can lead to back problems if the staff member has bad lifting technique.

Notably, there is value in crushed glass separated into different colours compared to crushed glass of mixed colours, which is a further reason why glass is traditionally taken off site for sorting and crushing.

The present invention seeks to address the above problems and to provide a glass-breaking device, particularly for us hi a bar establishment having a cellar beneath the bar.

SUMMARY OF THE INVENTION

Accordingly, the present invention is directed to a device for breaking glass articles comprising an inlet and an outlet in fluid communication with one another and having a rotating member interposed therebetween, the rotating member being attached to, and capable of being rotated by, a motor, wherein the inlet to the device opens onto the rotatable member and the outlet is substantially in the plane of the rotatable member, and wherein the rotatable member comprises portions to create an overall flow of air from the inlet towards the outlet, subsequently expelling the particles of the broken object away from the rotatable member through the outlet.

The glass bottle disposal and storage system according to be present invention addresses a number of the disadvantages of know systems. Additionally, it creates 'sharp-free' glass fragments that can be handled by a user without the need for gloves to be worn.

The creation of a flow of air from the inlet to the outlet reduces the risk of glass particles flowing back up the inlet towards to user. This is created by using an outlet that is in the plane of rotation of the rotatable member and may be assisted by having tapered portions on the rotatable member. With the broken particles of glass being expelled sideways with respect to the rotatable member, the overall height of the device is decreased and the debris is moved clear of the rotatable member, thereby reducing the risk of blockages occurring.

It is preferable that the air expelled from the outlet of the device is re-circulated through and to the inlet of the device. Re-circulating the air from the outlet to the inlet reduces the overall noise of the device, thereby making it more attractive to premises in which customers are present during operation of the device. Additionally, the re-circulating of the air reduces the risk of insects, especially flies, from entering the device. This increases the hygiene levels of with the device and reduces the risk of infestation. The air may be filtered before re-entering the device or it may be re-circulated without filtration occurring. Whilst filtering the air will reduce the level of glass particles in the air, the flow of air through the device prevents backflow of air towards the user and so filtration may not be necessary, although it could be preferable.

Preferably the device includes a bottle receiving conduit, the inlet to the conduit comprising a closing mechanism to prevent access to the conduit, wherein the mechanism comprises a closing member at one end of the conduit and arranged to block the conduit, when closed. Further preferably an electromagnetic locking mechanism is included in close proximity to the closing member, wherein when the electromagnetic lock is activated, the closing member prevents access to the conduit. Providing a sealable closing member adjacent to the end of the bottle receiving conduit allows the conduit to be sealed when not in use, thereby reducing the likelihood of insects from entering the conduit. This increases the hygiene of the conduit. Additionally, objects that are not intended to be put into the conduit are prevented from being accidentally put therein. Furthermore, the conduit can be sealed in a closed manner while maintenance occurs at the other end of the conduit. This protects the person servicing, cleaning or maintaining a device connected to the other end of the conduit. A further advantage is that the closing mechanism provides increased sound insulation from any noise created within or at the other end of the conduit.

It is preferable that an optical switch is provided within the conduit such that when a body is passed through the open conduit and triggers the optical switch, the electromagnetic switch is activated and the closing member is locked in a closed position for a predetermined length of time. By providing an optical switch the conduit may be sealed for a period of time to prevent a user from over loading the conduit, which may lead to blockages or damage occurring to a device positioned at the other end of the conduit. The delay may be seconds just to allow the device to deal with the previously entered object. This also assists with silencing for the conduit as the closing mechanism can be timed such that it opens only then the bottle has passed through the conduit and/or any processing device at the other end thereof.

It is advantageous that a colour detecting sensor is provided within the conduit and the conduit is also provided with a sorting mechanism, wherein the colour of the bottle detected and the route through the conduit is adjusted according to the colour of the bottle passing therethrough. In the same manner and for similar reasons that one might wish to put a colour detecting sensor into the glass breaking device disclosed herein, it may be advantageous to place the sorting system into the conduit.

Preferably, the closing member is biased to the closed configuration. Having the closing member biased in a closed manner prevents the entry of insects and foreign bodies whilst the device is not in use. Additionally, it prevents access to the device when it is being serviced or cleans so as to reduce the risk of injury resulting from accidental activation. A solenoid locking mechanism may be activated when the machine is turned off or any safety lock is triggered or any parts are compromised. This reduces the risk of blockages and damage and makes maintaining the device safer.

Advantageously, the conduit comprises a silencing mechanism in close proximity to the inlet. The silencing mechanism reduces the noise level that can escape from the opening of the conduit. This is particularly useful in areas where the conduit is installed in locations that are in close proximity to customers, for example in restaurants or bars and where additional noise is undesirable.

It is particular advantageous that the silencing mechanism comprises an open-cell foam and a double-wall construction. This use of such a construction provides a good level of sound attenuation, thereby absorbing the sound as it passes through the conduit and reducing the level of noise at the inlet to the conduit.

In a preferred construction, the conduit comprises an intumescent collar positioned along its length and around at least part of the circumference of the conduit. By providing an intumescent collar, especially one comprising hard char, the conduit is able to at least partially close should a fire break out. This ensures that should a fire break out at one end of the conduit, the risk of fumes passing through the conduit is reduced. It may be desirable for the conduit to comprise a thermoplastic that will soften and/or break when the intumescent collar is activated.

Optionally, the conduit comprises a kink along its length so that there is substantially no direct sightline between the inlet of the conduit and the outlet of the conduit. By creating a kink in the conduit, the risk of broken glass being passed back along the conduit is further reduced as the glass is unlikely to be able to pass through the kinked section. Additionally, or alternatively, a one-way mechanism may be positioned along the length of the conduit to prevent the back-flow of any glass.

Advantageously, the inlet comprises a tubular member containing a plurality of pathways, of which at least one pathway leads to the device, and wherein the colour of the object to be broken is determined and, based on the colour of the object, the object is sent along a particular pathway. Where the colour of the glass can be determined in the device, the bottle, or object, can be channelled to away to like-coloured bottles so that the glass is separated into colour. Because waste glass that has been sorted by colour has more value than mixed glass, there is a desire to sort the glass by colour, preferably before it is broken.

Preferably, rotatable members are provided at the end of at least two of the pathways within the tubular member. Having more than one breaking device allows for different colours of glass to be processed without having to stop the device from operating.

It is advantageous that an optical filter is positioned within the tubular member and is used to determine the colour of the object. Whilst the device could be operated manually in respect of sorting colours, the use of an optical filter—an optical device for detecting the colour of the glass passing through the device—automates the system and makes it easier for the user to operate the device.

In a preferred embodiment, the plane of the rotatable member is substantially perpendicular to the inlet. Where the rotatable member is substantially perpendicular to the inlet, the bottle hits the rotatable member fully and will shatter more completely than if the rotatable member is away from perpendicular. Whilst it is envisaged that the rotatable member could be offset from perpendicular, there is a greater impact between the bottle and the rotatable member when they are arranged perpendicularly and therefore there is a greater shattering effect in such an arrangement.

It is advantageous that a gap is provided around the circumference of the rotatable member in which fragments of the broken object are able to collect and grind against one another prior to being expelled through the outlet. Where the bottle shatters into larger portions, with a 'gutter' or gap around the circumference of the rotatable member, the pieces of glass may be ground against one another prior to being expelled through the outlet, thereby reducing their size.

It is desirably that a hopper is provided at the outlet to accept and retain the fragments of the broken object, and wherein the hopper comprises a valve at its lower end to allow the fragments to be released from the hopper. Using a valve mechanism the glass fragments can be dispensed from the hopper quickly and easily. Additionally, the valve may comprise a 'dose meter' such that it dispenses a predetermined amount of glass fragments. The fragments are sufficiently sized that they act like a liquid and so flow from the hopper through the valve under gravity.

In a further aspect of the invention there is provided a glass disposal system comprising a conduit with a first end located in a first location and the second end located in a second location and connected to the inlet of a device for breaking glass bottles in accordance with the amended device claims. Connecting a glass breaking device in accordance with the present invention to a conduit allows the user to be positioned away from the device, thereby keeping them further from the moving parts of device. By having the conduit and system readily available to staff during service, this reduces the time required to clean up once the bar or restaurant is closed and also reduces the noise associated with moving and disposing of bottles.

The system can produce glass fragments, that have few or no sharp edges and therefore creates a product that is relatively safe to handle without the need for protection. The edges of the glass are 'blunt' due to the impact of the rotatable member on the glass and the way in which the glass is shattered and then expelled. The particles contacting one another assists in reduces the sharpness of the edges of the glass fragments.

It is desirable that the glass disposal system comprises a bottle receiving conduit as disclosed herein at its first end. Combining the bottle receiving conduit of the present invention with the glass breaking device of the present invention provides a glass disposal system that is relatively quiet and safe for the operator to use. The silencing mechanism of the conduit combined with the safety and airflow of the device provides a system that can be used in environments where noise must be kept to a low level.

Advantageously, the system further comprises a method of removing the glass fragments from the hopper. In one construction, the method of removing the glass fragments from the hopper comprises a receptacle that attaches to the valve on the hopper. Providing containers or bags, such as sand bags, that attach to the valve allows for conveniently sized bodies filled with glass fragments to be produced. This allows them to be easily loaded for removal from site and because it is significantly compact compared to the unbroken glass it can be removed using a small vehicle or more glass can be fitted onto a regular vehicle.

In an alternative construction the method of removing the glass fragments from the hopper comprises a hose for attaching to the valve of the hopper and a suction system to suck the fragments through the hose. Using a hose and a suction system, the glass fragments can be moved from the hopper to a vehicle for transportation away from site. This reduces the labour required for moving the glass manually and allows for a quick and easy removal system. The hosing, or pipe work, required may be permanently installed and the hose to remove the glass from site attached to the end of the installed hosing. It may also be desirable to remove the glass from the hopper to an external bin that can then be taken away for emptying. Alternatively, the glass breaking device may be located outside the building so that the hopper can be quickly and conveniently emptied without requiring access to the building. This allows for collection out of normal business hours.

It is desirable that the first location is on one floor of a building and the second location is on a different floor of the building. By having the inlet to the conduit on once floor and the breaking device on another floor, the noise levels can be reduced further at the inlet end of the conduit and the device can operate in an environment that is easily accessible for emptying without interfering with customer service. For example, the conduit inlet may be installed in a bar on the ground floor of a building with the breaking device in the cellar thereof. This allows the bar staff to immediately put bottles into the conduit and for them to be processed in the cellar where noise is not such an issue. Additionally, the device hopper can be empties mid-shift without needing to clear space around the bar. Additionally, by using the hopper, the value on the hopper can be opened and the glass fragments removed while the glass breaking device is still operating. This reduces the 'down time' during emptying and allows continual service, or close thereto, during a shift.

The system is of particular use in bars, restaurants and other venues where a high number of glass bottles are used.

Additionally, the glass breaking device may be used as a stand-alone unit to reduce the volume taken up by the waste bottles at a particular location, thereby increasing the efficiency when the glass is removed. The removes the need to install the device between floors of a building and allows the device to be used without the conduit. As an example, this may be especially useful at festivals or in large venues with more than one bar where it is not practical to install a permanent system. In such a situation, the glass can be broken into small particles and stored in a hopper, thereby using less storage space. Additionally, the hopper may be emptied by way of a suction device that transports the broken glass into a portable hopper. This allows one larger hopper to be filled by smaller hoppers connected to devices scattered around a venue.

A suction device and larger hopper may be connected to the plurality of devices using a network of pipes and the broken glass immediately sucked to a central storage location. In such a situation one hopper can be used for multiple glass breaking devices, either on separate floors or on the same floor.

BRIEF DESCRIPTION OF THE DRAWINGS

Embodiments of the invention will now be described, by way of example only, and with reference to the accompanying drawings, in which.

DETAILED DESCRIPTION OF EXEMPLARY EMBODIMENT

The device disclosed herein is intended primarily, although not exclusively to be used in bars, and especially bars having a cellar beneath the bar—either directly beneath or to one side—to enable glass bottles to be disposed of readily and in a form convenient for transportation and recycling. However, the device is not limited to such an arrangement and can be used for example between floors of a building or also between a work surface and under bar. The bottles, in order to reduce the volume required for their storage prior to disposal and/or transport are broken into small pieces. Although the production of glass powder during the process is inevitable, the amount of powder is ideally as low as possible and the majority of the glass particles should have a diameter of from 5 mm-20 mm.

Figure 1:
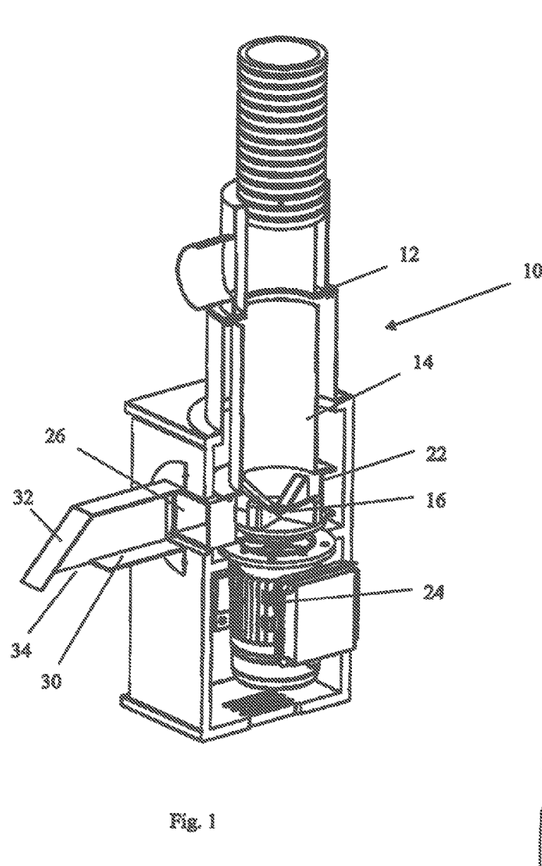
FIG. 1 is a perspective view of a glass breaking machine in accordance with the present invention.
Figures 3, 4:
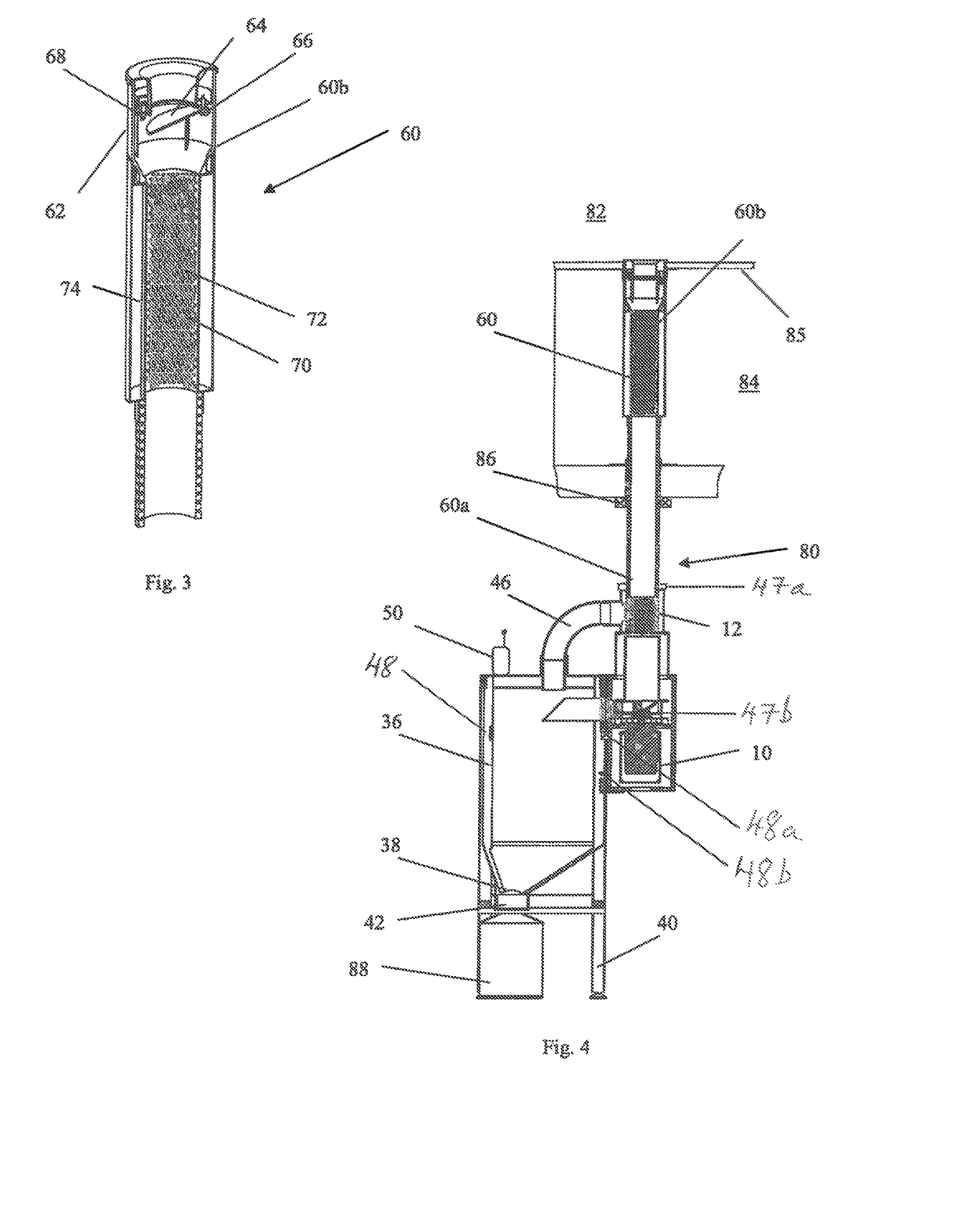
FIG. 3 is a sectional view of a first embodiment of a conduit in accordance with the present invention.
FIG. 4 is a sectional view of a system in accordance with the present invention.
Figure 7:
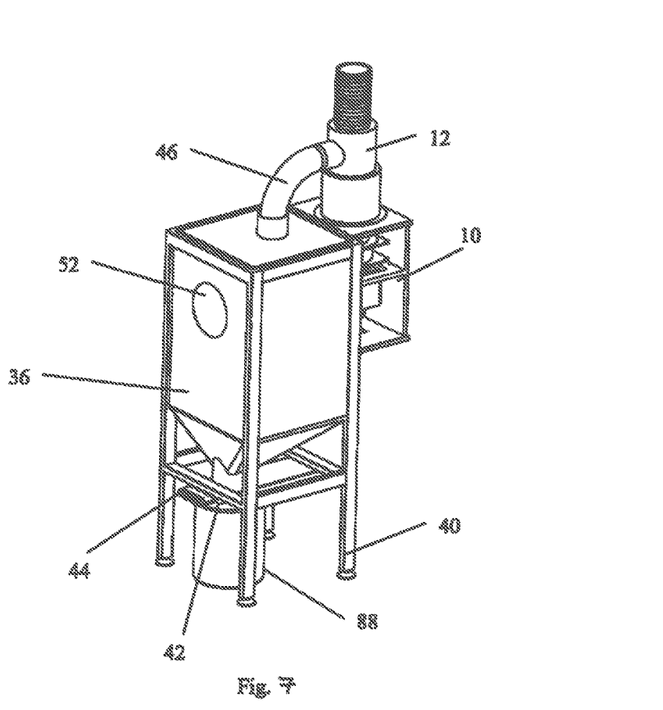
FIG. 7 is a perspective view of a system similar to that shown in FIG. 4 with parts exposed.

FIGS. 1, 4 and 7 show a glass breaking device 10, comprising an inlet 12 in the form of a substantially vertical circular conduit, which leads to an enclosed breaking chamber 14. At the lower end of the breaking chamber 14 is a rotatable member, or 'crown' 16 in the form of a circular disk 18 having four projections 20 extending upwardly therefrom towards the inlet 12, and spaced at regular intervals around the disk 18. The projections 20, which can also be protrusions, extensions or fins, extend from the circumference of the disk 18 to a position close to the centre of the disk 18, and are tapered such that they decrease in height from the circumference of the disk 18 to the centre thereof. The disk 18 is housed within a breaking chamber casing 22 and is arranged substantially horizontally and substantially perpendicularly to the inlet 12. The disk is mounted on a motor 24, which is provided with vibration absorbing mounts (not shown) to reduce any vibrations caused during operation.

Figure 2:
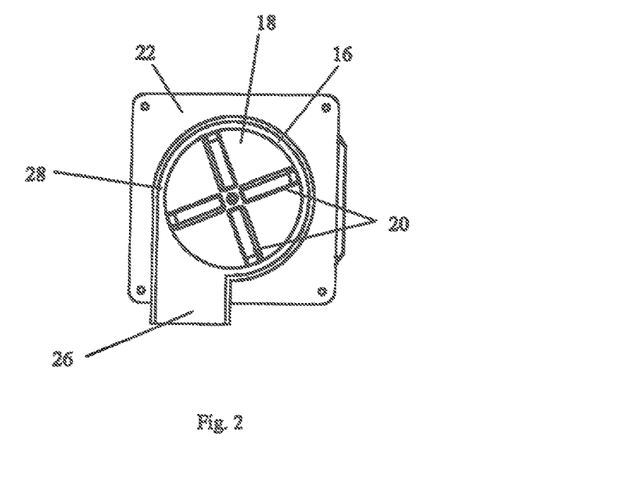
FIG. 2 is a top view of a section of the glass breaking machine of FIG. 1.

As shown more clearly in FIG. 2, the breaking chamber casing 22 has a substantially horizontal outlet 26 arranged in the plane of the disk 18. The outlet 26 has a width of approximately one radius of the disk 18 and a height of approximately the same height as the projections 20 at their tallest end. There is a gap 28 between the casing 22 and the disk 18 around three-quarters of the circumference of the disk 18, which is of an approximately constant size. The outlet 26 comprises an outlet channel 30, which has an angled deflection screen 32 and an opening 34 therebelow.

A gravity hopper 36 is provided beneath the opening 34. The hopper 36 has a tapered lower end with an opening 38 at its lowest point. The hopper 36 has legs 40 to raise it from the ground and provide a space beneath the hopper 36. The hopper 36 is provided with a valve 42, which comprises a slide door 44, which slides back and forth to open the opening 38 of the hopper 36 and allow the glass to be released from the hopper 36. One option available to the user is to release the glass into a trolley, able to contain and move, for example, around 300 kg of glass. To assist the emptying process, a vibration means can be utilised to vibrate the tapered portion of the hopper 36. Such a means can be attached directly to the outside of the tapered portion.

In a preferred embodiment, the top of the hopper 36 comprises an air conduit 46, which allows fluid communication between the hopper 36 and the inlet 12. A filter (not shown) may be provided at the end of the air conduit 46 connected to the hopper 36. The hopper 36 is also provided with a level indicating switch 48 in the form of a capacitive switch. A transmitter device 50 and a visual indicator (not shown) are connected to the level indicating switch 48 via a processor. A window 52 is provided in the side of the hopper 36.

A glass bottle receiving conduit 60 may be provided on the upper end of the inlet 12, as shown in FIGS. 3 and 4. The conduit 60 comprises a lower end 60a connected to the inlet 12 of the device 10 and an upper first end 60b. At the upper first end 60b a closing assembly 62 is provided, comprising a closing member or flap 64, which is attached to biasing means 66 that bias the closing member 64 in a closed position. The closing assembly 62 is optionally provided with a locking mechanism in the form of an electromagnetic lock 68 comprising a solenoid. The upper first end 60b of the conduit 60 is further provided with an optical sensor (not shown).

In an optional embodiment, not illustrated, the conduit has a kink or curve along its length which prevents an effective line-of-sight from the first to the second end of the conduit. The kink or similar structure can provide a means of reducing the chance of broken glass passing back up the conduit. Alternatively a one-way mechanism such as a flap can be included to prevent the passage of the glass up the conduit.

Adjacent to the locking mechanism 68 is a silencing section 70, comprising an inner wall of perforated material 72 and an open-celled muffling material 74. The silencing section 70 can comprise a double-wall with a sound-absorptive material such as a foam, fibre-glass or metal wool. In a further embodiment, not illustrated, the silencing section extends from the upper first end 60b of the conduit 60 to the inlet 12. Alternatively, the walls of the silencing section 70 can be a thick-walled, laser-sintered stainless steel fibre creating a single material tube with open cell pores to allow sound waves to be absorbed into the materials. To further reduce the sound emission, diaphragm ring seals 47a, 47b are included, firstly between the conduit 60 and the inlet 12 and second between the breaking chamber 14 and the outlet 26. The ring seals 47a, 47b allow the components to vibrate freely without causing vibrations in neighbouring components. Additionally, the seal 47a enables the inlet 12 to be slid away from the other components to facilitate maintenance.

As shown in FIG. 4, the system 80 is installed in a first location 82, for example a bar or restaurant on one floor, with the upper first end 60b of the conduit 60 attached to a bar 85 and the lower second end 60a of the conduit 60 located on the floor below 84 and connected to the inlet 12 of the breaking device 10. At the position that the conduit 60 passes though the ceiling of the lower floor 84, an intumescent collar 86 is attached around at least part of the conduit 60. It may be desirable to have a collar 86 on each side of the floor/ceiling through which the conduit passes 60. The intumescent collar 86 provides a degree of fire protection should it be required and prevents the conduit 60 acting as a chimney by closing off the airflow therethrough.

When the system 80 is turned on and ready to use, the user inserts a bottle into the conduit upper first end 60b of the conduit 60, preferably, with the base of the bottle entering the conduit 60 first. Upon the closing assembly 62 being activated, the device 10 powers up and the rotatable member 16 begins to be rotated by the motor 24. This may be due to activation of the electromagnetic switch. Alternatively, the bottle passing the optical sensor within the conduit may trigger the motor 24 to rotate the rotatable member 16.

The device 10 being triggered to turn on and for the motor 24 to rotate the rotatable member 16, upon insertion of a bottle allows for 'on-demand' operation of the device. This reduces the energy required to keep the device 10 ready to be used at any moment.

Additionally, the device 10 may automatically turn off. The device 10 may also turn off, or go into a 'rest', or stand-by mode if the optical detector in the conduit 60 is not triggered for more than a predetermined time, for example 5 seconds, but more likely pre-set to between 1 and 10 minutes. This assists with reducing the operating costs by energy and reduces the overall noise created by the device 10.

Once the bottle is completely within the conduit 60, the locking mechanism 62 may lock the closing member 64 in a closed position for a number of seconds, for example 1 second, to allow the bottle to clear the upper first end 60b of the conduit 60 before a second bottle is entered. This is not essential but can be desirable.

As the rotatable member 16 rotates air is forced through the outlet 26 by the projections 20. This creates a suction within the conduit 60 that pulls the air towards the breaking chamber 14 and acts to reduce the noise of operation as standing sound waves are not as easily set up. The bottle passes through the conduit 60 and, due to the effect of gravity enters the breaking chamber, whereupon it hits the rotatable member 16, which is rotating at around 1500 rpm. Upon impacting the rotatable member 16 the glass shatters into fragments of around 4 mm and less. Due to the shape of the rotatable member 16 and the projections 20 thereupon, the bottle is drawn towards the centre of the rotatable member 16. Any label attached to the bottle may also be broken into small parts due to the force of the impact. Where the label remains intact the movement of the glass within the system 90 will shred the label. The fragments of glass are then repeatedly contacted by the rotating projections 20 of the rotatable member 16 and the shatter further, thereby breaking into smaller fragments. Some fragments of glass will fall into the channel 28 around the outside of the rotatable member 16. These fragments are impacted within the channel by the rotating member 16 and other fragments. As such, they grind against one another and are broken down further.

The fragments of glass are forced around within the breaking chamber 14 and until they reach the outlet 26 at which point they are expelled from within the breaking chamber 14 into the outlet channel 30. The airflow through the device 10 further encourages the movement of the smaller glass fragments into the outlet channel 30. Due to the speed of rotation of the rotatable member 16 and the forces within the breaking chamber 14, the fragments of glass are expelled through the chamber 14 at high speed. They subsequently strike the angled deflection screen 32 and pass through the opening 34 into the hopper 36. In an alternative embodiment, not illustrated, the outlet channel 30 is foreshortened and the device 10 does not include an angled deflection screen 32. In this embodiment, a rubber flap hangs from the upper surface of the hopper 36 in line with the outlet 26. Glass exiting the breaking chamber 14 therefore impacts the rubber flap and falls into the main body of the hopper 36. The noise made by the glass impacting the rubber flap is less than that of the glass impacting the screen 32 as it exits the chamber 14, and so the overall noise produced by the device is therefore less than in the illustrated embodiment of FIG. 4.

The air conduit 46 allows air to flow from within the hopper 36 through to the inlet 12 of the device. The rotatable member 16 circulates the air around, thereby keeping the system substantially closed when the conduit 60 is closed at its upper first end 60*b*. This reduces the likelihood of insect ingress into the system 90. A filter (not shown) may be positioned at the end of the air conduit 46 or at a position therealong, although this is not essential. The filter reduces the risk of glass and glass-dust moving through the system and flowing back up the conduit 60.

Figure 5A:
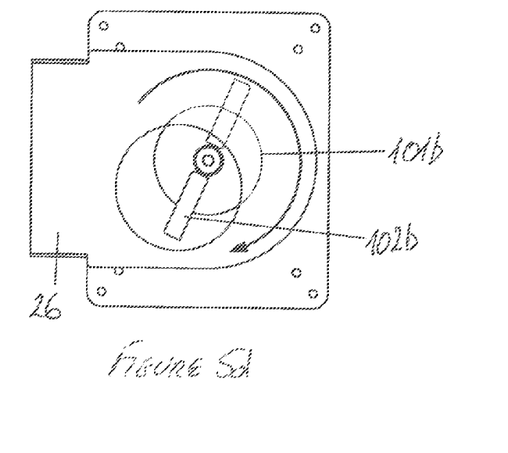
FIGS. 5a-5d show an offset arrangement of a conduit and a rotatable glass-breaking member.
Figure 5B:
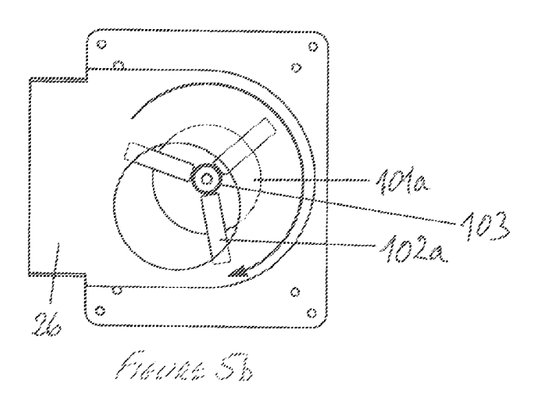
Figure 5C:
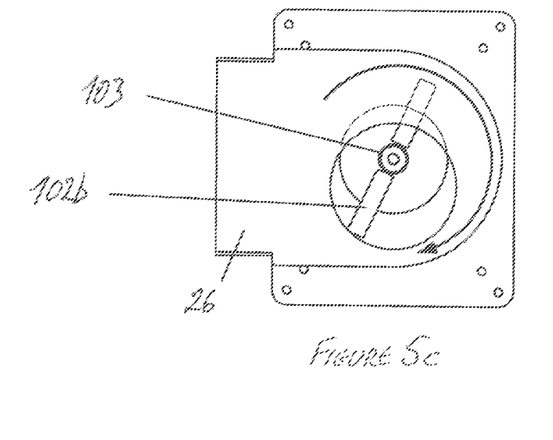
Figure 5D:
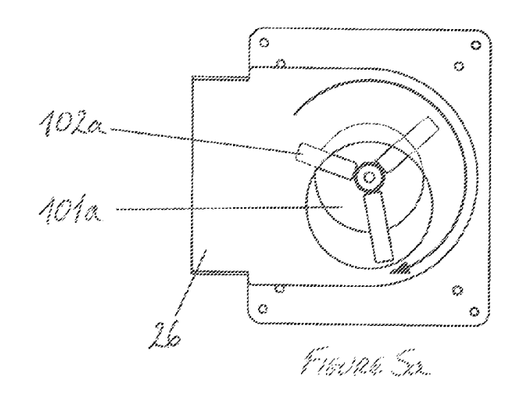

In preferred embodiments, shown in FIGS. 5*a*-5*d*, of the breaking chamber and rotatable member, FIGS. 5*a* and 5*b* show a rotatable member 101*a* having 3 projections 102*a* and FIGS. 5*c* and 5*d* show a rotatable member 101*b* having 2 projections 102*b*. In each of these embodiments the lower second end of the conduit 60*a* is offset relative to the centre 103 of the rotatable member In each embodiment in FIG. 5, the direction of rotation of the rotatable member is indicated by the arrow. As the glass article therefore engages the rotatable member 101*a*/101*b* the force acting on the glass article is directed towards the outlet 26 and also tends, in the case of a glass bottle, for example, to knock the bottle from a vertical orientation, aiding the breaking process.

The glass fragments settle under gravity within the hopper 36 and, due to their small size, act in a fluid-like manner in that they 'flow' towards the lowest point. The valve 38 at the lowest point within the hopper 36 is usually retained in a closed configuration during operation and may be biased in such a position to reduce the risk of glass fragments falling out of the hopper 36.

Receptacles 88 are attached to the valve 38 and the valve 38 is opened to allow the glass fragments to 'flow' into the receptacle 88. Once full, the receptacle 88 is sealed and moved from the valve 38 for storage or transportation from site. Alternatively, a hose (not shown) may be connected to the valve 38 and the glass fragments and be vacuumed from within the hopper 36 to a different location.

The glass fragments a mass within the hopper 36 and when a certain level is reached the capacitive level indicating switch 48 is operated by the presence of the glass fragments within the hopper 36. The indicating switch 48 is connected to a processor, which triggers the transmitter to signal that the hopper 36 requires emptying. The transmitter may alert a mobile device, such as a mobile telephone, belonging to the user and/or a third party that can empty the hopper 36. The third party may be a person assigned to remove the glass fragments from site. Additionally, or alternatively, the upper end of the conduit 60 may be provided with a visual indicator that is also triggered by the processor. The hopper 36 has a volume of up to 1000 kg, thereby allowing a large number of broken bottles (approximately 5000 beer bottles) to be retained therein. When the glass fragments reach the trigger of the level indicator, the system may prevent further bottles from being inserted into the conduit 60 by closing and locking the closing member 64.

The optical sensor at the upper first end 60*b* of the conduit 60 may be used to count the number of bottles inserted into the conduit and/or to enable the closing member 64 to be locked in place by the electromagnetic lock 68 for a predetermined period of time.

The upper first end 60*b* of the conduit 60 may be provided with an optical indicator, such as a screen or a light-emitting diode, which can indicate when the system is switched on, when the closing assembly 62 is open or locked, the level to which the hopper 36 is filled, when the system requires cleaning and/or servicing and/or any problems with the system.

The conduit 60 can be freestanding and extend from the floor without being connected to a bar or other object. In such a situation, it may be necessary to reinforce the conduit.

Figures 6A, 6B:
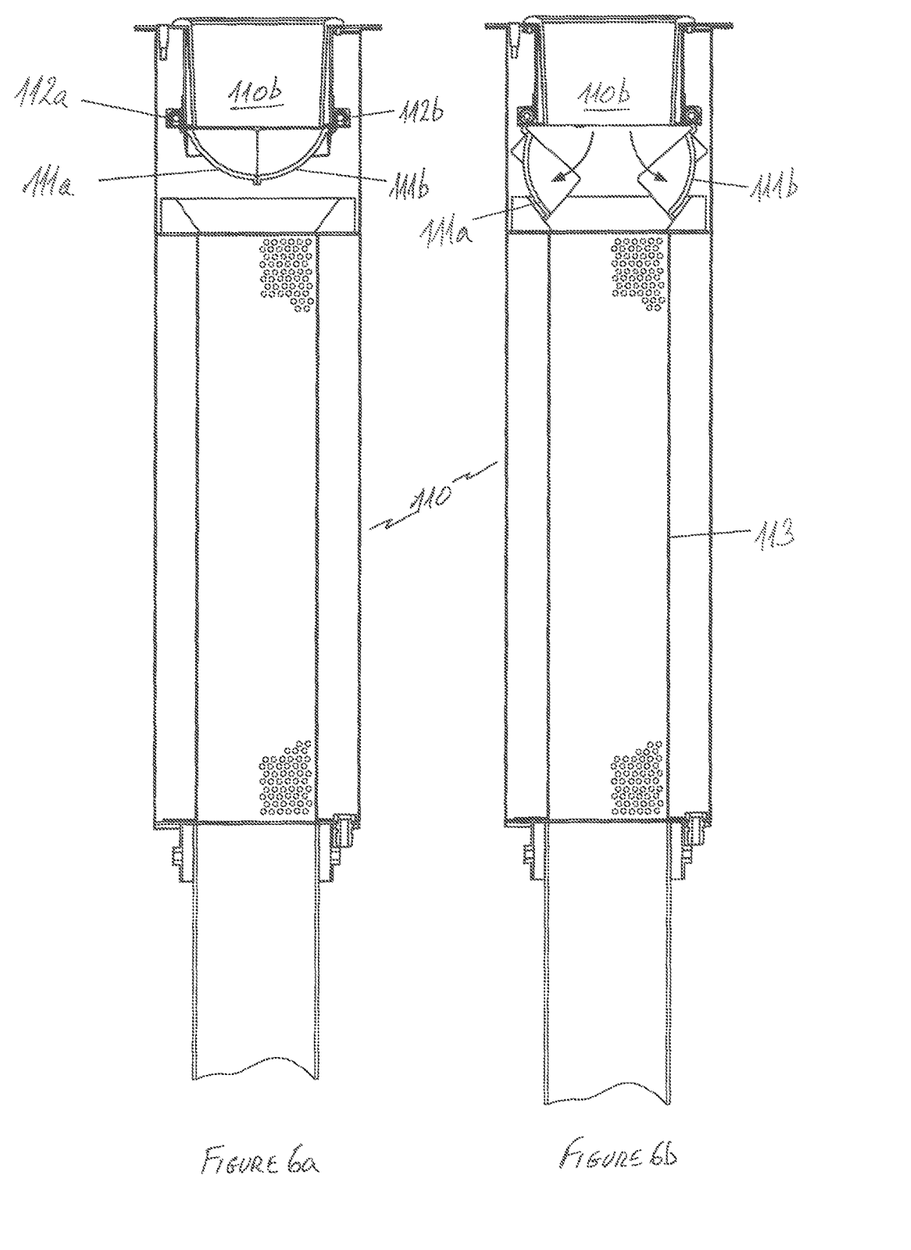
FIGS. 6a and 6b illustrate a second embodiment of a conduit.

FIGS. 6*a* and 6*b* illustrate a second embodiment of a conduit 110 having an alternative closure mechanism. The closure mechanism comprises a pair of double-sprung flaps 111*a*, 111*b*, each mounted on a hinge 112*a*, 112*b* and biased towards the closed position shown in FIG. 5*a* in which the flaps 111*a*, 111*b* co-operate to close the conduit 80. On insertion of a bottle into the upper first end 110*b* of the conduit 110, the pressure exerted by the bottle opens the flaps 111*a*, 111*b* in the direction shown by the arrows, allowing the bottle to fall along the conduit throat 113 towards the inlet 12. The use of two flaps 111*a*, 111*b*, rather than the single flap 64 of the first embodiment results in the bottle being more likely to pass straight into the throat 113 without touching the sides of the throat 113. The noise of the passage of the bottle through the device is thereby reduced. The noise reduction is enhanced by the use of a soft elastomeric material to form the flaps 111*a*, 111*b*. As with the first embodiment of a conduit shown in FIG. 3, the walls of the conduit 110 can be formed to absorb sound.

As alternative closure means, particularly where the machine is intended to be run continuously rather than on demand, brushes or a star flap can be included towards the top of the conduit 60. A yet further alternative comprises a liftable closure flap, whose raising causes activation of the rotatable member, for example, for a pre-set time.

The inlet 12 to the device 10 may comprise a service collar that and be raised to get, access to the inlet. This may be particularly useful for removing any blockages or for accessing the connection between the device 10 and the conduit 60.

Figure 8:
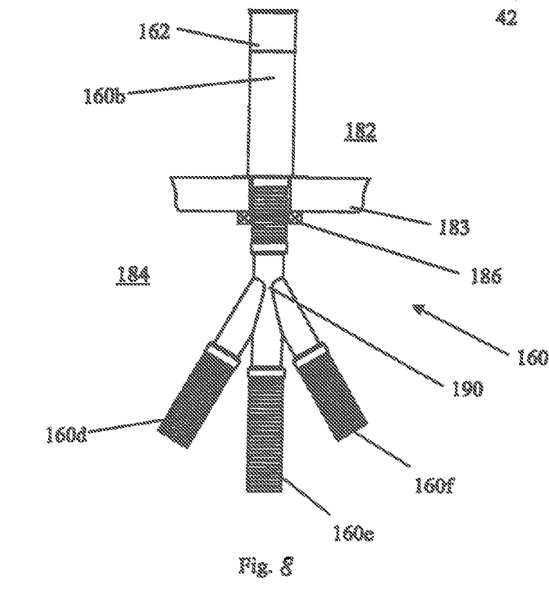
FIG. 8 is a side view of a further embodiment of a conduit in accordance with the present invention.

FIG. 8 shows a conduit 160 comprising an upper end 160*b* having a closing assembly 162 as outlined in respect of FIGS. 3 and 4. An optical sensor (not shown), connected to a processor, is arranged within the conduit in close proximity to the closing assembly 162. The optical sensor is able to determine the colour of the glass bottle passing through the conduit 160. The conduit 160 is installed though a surface 183 between a first location 182 and a second location 184. An intumescent collar 186 is positioned around at least part of the circumference of the conduit 160. In close proximity to the position where the conduit 160 extends through the surface 183, a junction 190 is provided in the conduit 160. The junction comprises three sections of conduit 160*d*, 160*e* and 160f joined to the upper end of the conduit 160. Within the conduit 160 there is a diversion mechanism that prevents access to all but one of the sections of conduit 160d, 160e and 160f at any one time.

When in use, a bottle is inserted into the conduit 160 and it passes the optical sensor which identifies the colour of the glass. The diversion mechanism is then moved to a position that corresponds to a certain colour of glass bottle. For example, when the bottle is made from green glass it will prevent access to two of the conduit sections 160e and 160f and the bottle will pass through the 'open' section 160d. Where the glass is a different colour, the bottle will be diverted through a difference section of conduit 160d, 160e and 160f. Therefore, the mechanism sorts the bottles according to colour and diverts them to a predetermined location.

The three sections of conduit 160d, 160e and 160f may all be provided with glass breaking devices 10 such that the glass bottles are sorted and broken according to colour.

This results in different colours of glass in each hopper corresponding to the device to which it is attached.

The rotatable member may be made from, or tipped with, a hardened material, including hardened steel, manganese steel, or tungsten carbide. Other parts may also be constructed from hardened material as required. A combination of materials may be used to provide the hardened coating. The rotatable member is rotated at speeds of between 1400 rpm and 300 rpm, but preferably around 1500 rpm. Furthermore, the rotatable member may comprise one or more portions to encourage air flow through the rotatable member. Such portions may be angled 'wingless' to assist with creating a larger airflow current.

A typical rotatable member has 2-4 projections 20 shown in FIG. 2. Although the number of projections can be greater than this, the risk arises of too much powder being produced which can be hazardous.

The projections themselves can have a wedge shape, with the slope of the wedge angled down towards the centre of the rotatable member. The advantage of a wedge shape is that the thicker end of the wedge acts to 'sweep', either by direct engagement with or by projecting particles against, glass beyond the volume described by the projections as they rotate: thus cleaning the breaking chamber 14 of particulate material. Moreover, where a projection 20 presents a horizontal, and not a sloping surface, to a glass article such as a bottle, the article can sit on the effective surface formed as the projections rotate. The slope of the wedge can be from 15 to 70 degrees, preferably 15-50 degrees, and especially preferably 25-30 degrees to the horizontal and can also include teeth or waves where desired to assist in breakdown of the glass.

Were the glass is sorted by colour, a different glass breaking machine may be provided for each colour so that there is a specific device for each specific colour. Alternatively, the device may sort the glass into colours and store them separately so that one colour of bottle can be dealt with at a time by a single machine. For example, green bottles may be broken immediately and brown, blue and clear bottles stored in hoppers until the end of a shift. At that time, the broken glass hopper can be emptied of green glass and the other colours processed one after another with the broken glass hopper emptied after each colour has been dealt with. Alternatively, green glass, which is more prevalent in some bars, may be sorted and other colours mixed, thereby requiring two breaking devices. Clearly, the colours for sorting and breaking in such a system are dependent upon the location and type of bottles to be broken and it may be that another colour is processed immediately and the rest stored for later.

Lap joints may be used to secure the parts of the conduit and device to one another and steel, more specifically mild steel and stainless steel, may be used for a number of parts. A floor and/or ceiling mount may be used where the conduit passes from one floor of a venue to another in order to secure the conduit and reinforce it.

A sliding air-inlet manifold may be provided to allow the easy access to the inlet of the device. Preferably, the inner wall of the sliding inlet is perforated is reduce the noise passing into the conduit and it may be provided with muffling media between an inner and outer wall to attenuate sound passing therethrough.

Extra silencing insulation may be provided in the conduit and/or on/in the glass breaking device according to the location. Additionally, it may be desirable to incorporate vibration absorbing parts to reduce the noise and movement of the system.

The particles of broken glass may be typically between 4 mm and 20 mm and preferably between 4 mm and 10 mm. Due to their size, such particles are able to flow through pipework in the same way that sand flows. The hopper may have a capacity of between 100 kg and 5000 kg, although other sizes are envisaged as being possible depending upon the space available and the requirements.

The level indicator within the hopper may comprise a capacitance switch, a level switch or a pendulum switch, or a combination thereof. Additionally, there might be a "high" and "high-high" level indicating system. For example, in FIG. 4, level indicators 48a, 48b indicate that the device 10 is respectively full or needs to be emptied. Indicators at the upper end of the conduit may indicate that a) the system is ready to use b) a fault has occurred, for example, the machine is switched off or the hopper is full; and/or c) the hopper requires emptying but the system can still be operated. Various other indicators may be desirable, for example, when the device is due to be cleaned or serviced. Alternatively, the sensors incorporated can be used in conjunction with a processor control unit to count and display the number of articles inserted or the rate at which the device is being used.

Numerous other variations and modifications to the illustrated construction may occur to the reader familiar with the art without taking the device outside the scope of the present invention. For example, whilst the present invention has been described in relation to glass bottles, clearly, glasses and other objects could be destroyed using the system of the present invention.

The conduit can include an aperture, to allow air to be drawn into the device. The aperture is ideally covered by a filter material to prevent passage of dust particles and the filter would need to be regularly checked to ensure that the filter had not become clogged up, which would cause difficulties as air flow within the device would be hindered.

Additionally, other types of valves could be used at the bottom of the hopper and may include a dosing system to ensure that a predetermined amount of glass is dispensed when operated. For example, slide, iris, butterfly, pinch, rotating, peristaltic, guillotine or other valves may be used and they may be operated manually, automatically, and/or electronically.

The rotatable member can be oval and positioned on an angle rather than being a substantially horizontal disk. The glass may not break as predictably, nor the airflow be as reliable, and in such a situation, the outlet may require moving to a different angle, however, it may be desirable in some embodiments of the present invention.

Furthermore, various other level indicating switches and mechanisms may be employed for detecting when the hopper is full and notifying a relevant person. There may be a plurality of level indicators to show how full the hopper has become. Such a system may employ one or more 'warnings' that the hopper is becoming full prior to notification that it is full.

The collection receptacles, or vessels, may comprise bags, trays, boxes, buckets or any other article capable of receiving the broken glass inside. Preferably, these hold around 25 kgs, which is the recommended Health and Safety guideline weight.

The term "glass breaker" is intended to include smashing, breaking, imploding, exploding and otherwise reducing glass and ceramic materials into smaller particles.

The invention claimed is:

1. A device for breaking glass articles, the device comprising an inlet and an outlet in fluid communication with one another and having a rotatable member interposed there between, the rotatable member being attached to, and capable of being rotated by, a motor, wherein the inlet to the device opens onto the rotatable member and the outlet is substantially in the plane of the rotatable member, and wherein the rotatable member comprises portions to create an overall flow of air from the inlet towards the outlet, subsequently expelling particles of a broken object away from the rotatable member through the outlet, the device having an air-conduit linking the inlet and the outlet, wherein the air expelled from the outlet of the device is re-circulated through and to the inlet of the device.

2. A device according to claim 1, comprising a conduit having a first end to receive glass articles and a second end opening into the inlet, the conduit including a closing mechanism to prevent access to the conduit, said mechanism comprising a closing member at one end of the conduit and arranged to block the conduit when closed.

3. A device according to claim 2, including an electromagnetic locking mechanism in close proximity to the closing member, wherein when the electromagnetic locking mechanism is activated, the closing member prevents access to the conduit.

4. A device according to claim 2, wherein an optical switch is provided within the conduit such that when a body is passed through the open conduit and triggers the optical switch, an electromagnetic switch is activated and the closing member is locked in a closed position for a predetermined length of time.

5. A device according to claim 2, wherein a colour detecting sensor is provided within the conduit and the conduit is also provided with a sorting mechanism, wherein the colour of a bottle detected and a route through the conduit is adjusted according to the colour of the bottle passing therethrough.

6. A device according to claim 2, wherein the closing member is biased to a closed configuration.

7. A device according to claim 2, wherein the conduit comprises a silencing mechanism in close proximity to the inlet.

8. A device according to claim 7, wherein the silencing mechanism comprises open-cell foam and a double-wall construction.

9. A device according to claim 2, wherein the conduit comprises an intumescent collar positioned along its length and around at least part of the circumference of the conduit.

10. A device according to claim 2, wherein the conduit comprises a kink along its length so that there is substantially no direct sightline between the inlet of the conduit and the outlet of the conduit.

11. A device according to claim 1, wherein the inlet comprises a tubular member containing a plurality of pathways, of which at least one pathway leads to the device, and wherein a colour of the object to be broken is determined and, based on the colour of the object, the object is sent along a particular pathway.

12. A device according to claim 11, wherein rotatable members are provided at an end of at least two of the pathways within the tubular member.

13. A device according to claim 11, wherein an optical filter is positioned within the tubular member and is used to determine a colour of the object.

14. A device according to claim 1, wherein the plane of the rotatable member is substantially perpendicular to the inlet.

15. A device according to claim 1, wherein a gap is provided around the circumference of the rotatable member in which fragments of the broken object are able to collect and grind against one another prior to being expelled through the outlet.

16. A device according to claim 1, wherein a hopper is provided at the outlet to accept and retain the fragments of the broken object, and wherein the hopper comprises a valve to allow the fragments to be released from the hopper.

17. A device according to claim 1, comprising a conduit having a first end to receive glass articles and a second end opening into the inlet, the conduit including a closing mechanism to prevent access to the conduit, said mechanism comprising a closing member at one end of the conduit and arranged to block the conduit when closed.

* * * * *